(12) United States Patent
Huang et al.

(10) Patent No.: US 11,427,963 B2
(45) Date of Patent: *Aug. 30, 2022

(54) ADHESIVE HAVING INSULATIVE PROPERTIES

(71) Applicant: HENKEL IP & HOLDING GMBH, Duesseldorf (DE)

(72) Inventors: Tianjian Huang, Hillsborough, NJ (US); Robert Sandilla, Wexford, PA (US); Daniel Waski, Elmhurst, IL (US)

(73) Assignee: HENKEL AG & CO, KGaA, Dusseldorf (DE)

(*) Notice: Subject to any disclaimer, the term of this patent is extended or adjusted under 35 U.S.C. 154(b) by 269 days.

This patent is subject to a terminal disclaimer.

(21) Appl. No.: 16/237,832

(22) Filed: Jan. 2, 2019

(65) Prior Publication Data

US 2019/0136456 A1 May 9, 2019

Related U.S. Application Data

(60) Continuation of application No. 15/410,234, filed on Jan. 19, 2017, now Pat. No. 10,208,429, which is a division of application No. 14/273,183, filed on May 8, 2014, now Pat. No. 9,580,629, which is a division of application No. 13/775,348, filed on Feb. 25, 2013, now Pat. No. 8,747,603, which is a continuation of application No. PCT/US2011/050965, filed on Sep. 9, 2011.

(60) Provisional application No. 61/381,642, filed on Sep. 10, 2010.

(51) Int. Cl.

| | |
|---|---|
| *D21H 19/54* | (2006.01) |
| *D21H 21/54* | (2006.01) |
| *C08L 3/02* | (2006.01) |
| *B32B 37/06* | (2006.01) |
| *C09J 103/02* | (2006.01) |
| *B31F 1/20* | (2006.01) |
| *B31F 1/28* | (2006.01) |

(52) U.S. Cl.
CPC ............. *D21H 19/54* (2013.01); *B31F 1/20* (2013.01); *B31F 1/2809* (2013.01); *B32B 37/06* (2013.01); *C08L 3/02* (2013.01); *C09J 103/02* (2013.01); *D21H 21/54* (2013.01); *C08L 2205/025* (2013.01); *Y10T 156/1025* (2015.01)

(58) Field of Classification Search
CPC ....... D21H 21/54; D21H 19/54; C09J 103/02; C09J 103/00; C09J 103/04; C09J 103/12; C09J 103/14; B32B 2305/72; B32B 2305/74; B32B 37/06; B32B 2037/1253; B32B 2038/0076; B29C 2035/0827; B29C 2045/0075; B29C 33/06; B29C 35/0805

See application file for complete search history.

(56) References Cited

U.S. PATENT DOCUMENTS

| | | | |
|---|---|---|---|
| 2,147,689 A | 2/1939 | Chaffee | |
| 2,998,501 A | 8/1961 | Edberg et al. | |
| 3,152,749 A | 10/1964 | Young | |
| 3,252,064 A | 5/1966 | Duncan | |
| 3,253,064 A | 5/1966 | Buonaiuto | |
| 3,342,613 A | 9/1967 | Schelhorn | |
| 3,401,475 A | 9/1968 | Morehouse et al. | |
| 3,563,851 A | 2/1971 | Armour et al. | |
| 3,615,972 A | 10/1971 | Morehouse, Jr. et al. | |
| 3,732,975 A | 5/1973 | Poncy | |
| 3,904,429 A | 9/1975 | Eastman et al. | |
| 4,005,033 A | 1/1977 | Georgeau | |
| 4,006,273 A | 2/1977 | Wolinski et al. | |
| 4,038,762 A | 8/1977 | Swan, Jr. | |
| 4,087,002 A | 5/1978 | Bambara et al. | |
| 4,094,685 A | 6/1978 | Lester et al. | |
| 4,350,788 A | 9/1982 | Shimokawa et al. | |
| 4,483,889 A * | 11/1984 | Andersson ................ | B32B 5/18 |
| | | | 427/389.9 |
| 4,661,401 A | 4/1987 | Akao | |
| 4,708,896 A | 11/1987 | Akao | |
| 4,720,410 A | 1/1988 | Lundquist et al. | |
| 4,925,711 A | 5/1990 | Akao et al. | |
| 5,030,302 A | 7/1991 | Jud et al. | |
| 5,082,744 A | 1/1992 | Akao et al. | |
| 5,100,721 A | 3/1992 | Akao | |
| 5,114,509 A | 5/1992 | Johnston et al. | |

(Continued)

FOREIGN PATENT DOCUMENTS

| | | |
|---|---|---|
| CA | 2078476 A1 | 3/1993 |
| CA | 2145938 A1 | 10/1995 |

(Continued)

OTHER PUBLICATIONS

Radio Frequency (RF) vs. Microwave (MW). Retrieved from http://www.stalam.com/en/technologies/radio-frequency-and-micro-wawes.html.
Radio frequency (RF) vs. microwave (MW) (n.d.). Retrieved from https://www.stalam.com/eng/technology-and-benefits/rf-vs-microwaves.
Popil, Roman E. et al. "Adhesive level effect on corrugated board strength—experiment and FE modeling." In: International progress in paper physics seminar. Oxford, Ohio: Miami University, 2006.

(Continued)

*Primary Examiner* — Philip C Tucker
*Assistant Examiner* — Jimmy R Smith, Jr.
(74) *Attorney, Agent, or Firm* — Sun Hee Lehmann (57) ABSTRACT

An improved adhesive composition having increased insulative properties is provided. The adhesive composition having improved insulative properties includes a starch component; an alkaline component; sodium tetraborate; water; and a plurality of expandable microspheres. Products having improved insulation capabilities and methods of making the products having improved insulation capabilities are also provided. The present adhesive and products including the adhesive is environmentally friendly.

3 Claims, 5 Drawing Sheets

(56) References Cited

U.S. PATENT DOCUMENTS

| | | |
|---|---|---|
| 5,264,467 A | 11/1993 | DiStefano |
| 5,277,737 A | 1/1994 | Li et al. |
| 5,342,467 A | 8/1994 | Corey |
| 5,356,683 A | 10/1994 | Egolf et al. |
| 5,387,626 A | 2/1995 | Boehme-Kovac et al. |
| 5,393,336 A * | 2/1995 | Foran .................... C09J 103/00 106/208.1 |
| 5,451,437 A | 9/1995 | Insley et al. |
| 5,542,599 A | 8/1996 | Sobol |
| 5,636,493 A | 6/1997 | Weder |
| 5,685,480 A | 11/1997 | Choi |
| 5,759,624 A | 6/1998 | Neale et al. |
| 5,881,883 A | 3/1999 | Siegelman |
| 5,928,741 A * | 7/1999 | Andersen ................ B29C 51/10 428/35.7 |
| 6,139,961 A | 10/2000 | Blankenship et al. |
| 6,231,970 B1 * | 5/2001 | Andersen ................ C08L 3/02 106/145.1 |
| 6,255,369 B1 | 7/2001 | Philbin et al. |
| 6,312,713 B1 | 11/2001 | Korol et al. |
| 6,379,497 B1 | 4/2002 | Sandstrom et al. |
| 6,648,955 B1 | 11/2003 | Swiezkowski et al. |
| 6,740,373 B1 * | 5/2004 | Swoboda ................ B32B 29/06 229/5.81 |
| 6,740,706 B2 | 6/2004 | Skryniarz et al. |
| 6,749,705 B2 | 6/2004 | Skryniarz et al. |
| 6,838,187 B2 | 1/2005 | Figiel et al. |
| 7,335,279 B2 | 2/2008 | Monhan et al. |
| 7,799,968 B2 | 9/2010 | Chen et al. |
| 8,574,698 B2 | 11/2013 | Fung et al. |
| 9,260,633 B2 | 2/2016 | Hoa et al. |
| 2002/0068139 A1 | 6/2002 | Polak et al. |
| 2002/0071947 A1 | 6/2002 | Soane et al. |
| 2002/0094403 A1 | 7/2002 | Ishikawa et al. |
| 2002/0182347 A1 | 12/2002 | DeBraal et al. |
| 2003/0034117 A1 | 2/2003 | Thomas et al. |
| 2004/0033343 A1 | 2/2004 | Comeau et al. |
| 2004/0191438 A1 | 9/2004 | Cosentino et al. |
| 2007/0009723 A1 | 1/2007 | Ogawa et al. |
| 2007/0155859 A1 | 7/2007 | Song et al. |
| 2007/0224395 A1 | 9/2007 | Rowitsch et al. |
| 2007/0228134 A1 | 10/2007 | Cook et al. |
| 2007/0287776 A1 | 12/2007 | Nordin et al. |
| 2008/0017338 A1 | 1/2008 | Nordin et al. |
| 2008/0055380 A1 | 3/2008 | Regan et al. |
| 2008/0118693 A1 | 5/2008 | Bilski et al. |
| 2009/0280322 A1 | 11/2009 | Daniels et al. |
| 2009/0321508 A1 | 12/2009 | Fu et al. |
| 2010/0012712 A1 | 1/2010 | Swoboda et al. |
| 2010/0068544 A1 | 3/2010 | Huang et al. |
| 2010/0119741 A1 | 5/2010 | Cimecioglu et al. |
| 2010/0136269 A1 | 6/2010 | Andersen et al. |
| 2010/0139878 A1 | 6/2010 | Nicolucci |
| 2010/0181015 A1 * | 7/2010 | Kohler .................. B31F 1/2872 156/210 |
| 2011/0019121 A1 | 1/2011 | Mo et al. |
| 2011/0033398 A1 | 2/2011 | Cauvin et al. |
| 2012/0015162 A1 | 1/2012 | Lion et al. |
| 2012/0043373 A1 | 2/2012 | Babinsky et al. |
| 2012/0048450 A1 * | 3/2012 | Fu ......................... B32B 29/005 156/83 |
| 2012/0100289 A1 | 4/2012 | Egan et al. |
| 2013/0160945 A1 | 6/2013 | Huang et al. |
| 2013/0303351 A1 | 11/2013 | Fu et al. |
| 2014/0131367 A1 | 5/2014 | Bordary et al. |

FOREIGN PATENT DOCUMENTS

| | | |
|---|---|---|
| CN | 1449913 A | 10/2003 |
| CN | 1643100 A | 7/2005 |
| CN | 101263184 A | 9/2008 |
| CN | 101476265 A | 7/2009 |
| EP | 0890625 A1 | 1/1999 |
| EP | 1216146 B1 | 10/2005 |
| EP | 1634897 A2 | 3/2006 |
| EP | 1674543 A1 | 6/2006 |
| EP | 1780250 A1 | 5/2007 |
| JP | S6144965 A | 3/1986 |
| JP | H05239423 A | 9/1993 |
| JP | 6313163 A | 11/1994 |
| JP | H08175576 A | 7/1996 |
| JP | 9-164621 A | 6/1997 |
| JP | 09217050 A | 8/1997 |
| JP | 2000-6285 A | 1/2000 |
| JP | 2001207146 A | 7/2001 |
| JP | 2002241450 A | 8/2002 |
| JP | 2003-154589 A | 5/2003 |
| JP | 2005097816 A | 4/2005 |
| JP | 2010202996 A | 9/2010 |
| WO | 9014223 A1 | 11/1990 |
| WO | 0162986 A1 | 8/2001 |
| WO | 0200800 A2 | 1/2002 |
| WO | 0231077 A2 | 4/2002 |
| WO | 2005110737 A1 | 11/2005 |
| WO | 2007091961 A1 | 8/2007 |
| WO | 2007135451 A1 | 11/2007 |
| WO | 2007142593 A1 | 12/2007 |
| WO | 2008084372 A1 | 7/2008 |

OTHER PUBLICATIONS

Bermesheva, E.V. "Zavisimost mezhdu vyazkouprugimi I adgezivnymi svoistvami polimernykh adgezivov. Dopolneni kriteriya liplosti Dalkkuista", 25 Sipozium Po Reologii, G.Ostashkov, Sep. 5-10, 2010, pp. 61-62.

* cited by examiner

ADHESIVE HAVING INSULATIVE PROPERTIES

FIELD OF THE INVENTION

The present invention relates to an adhesive composition having improved insulative properties. In particular, the invention includes an adhesive composition and method of making an adhesive composition for use in providing insulation to paper products, including corrugated products.

BACKGROUND OF THE INVENTION

Paper board, including corrugated paper board, is commonly used to provide insulation for various products, including paper cups. Traditionally, corrugated paper board is prepared by first forming a corrugated element, or "medium", by passing a cellulosic sheet between corrugating rolls forming a substantially sinusoidal or serpentine cross-section in the sheet. The tips of the sinusoidal portion are referred to as flutes. An adhesive is commonly applied to the tips of the flutes, and a noncorrugated or planar cellulosic liner is applied against the adhesive coated flutes of the corrugated elements as the corrugated sheet passes between a corrugating roll and a pressure roll. A resulting paper product having the corrugating medium on one side and the planar liner on another side is called a single-faced web. The single-faced element may be used as is in certain applications as a liner or buffer material within a container. In some products, the adhesive is also applied to the flute tips of the single-faced web and a second liner sheet is subsequently applied to the fluted medium in a "double faced" operation. The second liner sheet is exposed to conditions of heat and pressure during its contact with the adhesive. In practice, the sheet of corrugated cardboard most frequently encountered has two plane sides placed on each side of the corrugated medium. Depending on the specific strength desired, a sheet of corrugated board may also be provided with a more complex structure, such as two corrugated mediums and three plane surfaces, two outer ones and one inner one separating the two corrugated medium.

Starch-based adhesives are most commonly used in the corrugating process due to their desirable adhesive properties, low cost and ease of preparation. The most fundamental starch corrugating adhesive, commonly referred to as a "Stein-Hall" formulation, is an alkaline adhesive that is comprised of raw, ungelatinized starch suspended in an aqueous dispersion of cooked starch. The adhesive is produced by gelatinizing starch in water with sodium hydroxide (caustic soda) to yield a primary mix of gelatinized or cooked carrier, which is then slowly added to a secondary mix of raw (ungelatinized) starch, borax and water to produce the fully formulated adhesive. In conventional corrugating processes, the adhesive is applied to the tips of the fluted paper medium or single-faced board, whereupon the application of heat and pressure causes the raw starch to gelatinize, resulting in an instantaneous increase in viscosity and formation of the adhesive bond.

While typical adhesives are sufficient to adhere the various layers of the insulating paper together, these adhesives do not act as insulation themselves. Thus, in typical situations, there is required at least two layers of paper (the liner and the medium), and in many situations three layers are required (two liners and the medium). To achieve proper insulation, typical insulating products require the medium to have a fairly high amplitude in its wave pattern, requiring more paper to be used in formation of the medium. These typical formulations result in a tremendous amount of paper to be used for the product, which not only adds cost to the production but also is not environmentally sound.

The present invention seeks to improve insulating papers, through the use of an adhesive composition that adds insulative properties to the product. In addition, the adhesive and the products made therefrom are made from natural components and are environmentally conscious. The present invention provides an environmentally sound insulating adhesive that provides sufficient adhesion to the product upon which it is being applied.

SUMMARY OF THE INVENTION

The present invention relates to a starch composition and method of using the starch composition, which provides a greater insulation while maintaining sufficient strength of the adhesive. The present invention balances the curing properties of the starch composition with the expansion properties of an insulating component to provide a suitable adhesive. In particular, the starch composition is selected to have gelatinization and cure temperatures, which also allow for sufficient expansion of the insulating component, to maximize the benefits of both adhesive strength and insulative properties.

In a first embodiment of the present invention, there is provided an adhesive composition having improved insulative properties, including a starch component; an alkaline component; sodium tetraborate; water; and a plurality of expandable microspheres, where the starch component is selected to permit full gelatinization of the starch component at a temperature at or greater than the temperature at which the expandable microspheres expand.

Another embodiment of the invention provides a method of preparing a corrugated product having improved insulative properties, including the steps of: providing a substantially flat paper liner having a first side and second side; providing a paper liner having a plurality of flutes each having a peak and a trough; preparing an adhesive composition having improved insulative properties, including the steps of: combining the high amylose starch component, an alkaline component, a crosslinker, and water to form a starch mixture, and then cooking the high amylose starch mixture to form a cooked starch mixture; adding an unmodified starch component to the cooked starch mixture; and adding a plurality of expandable microspheres to the cooked starch mixture; applying the adhesive composition to a tip of each of the flutes; mating the peaks of said flutes with a surface of the first side of the planar paper liner to form a composite structure where the first paper liner and the second paper liner contact each other at the peaks of the flutes; curing the adhesive composition in the composite structure to a first temperature and to a second temperature, where the first temperature and the second temperature differ by about 20° F. to about 40° F.

Still another embodiment of the invention provides a method of making an insulative sheet, including the steps of: providing a substantially flat paper sheet having a first side and a second side, the first side having a surface with a sufficient structure to accommodate an insulating component; preparing an adhesive composition including the steps of: combining the high amylose starch component, an alkaline component, a crosslinker, and water to form a starch mixture, and then cooking the high amylose starch mixture to form a cooked starch mixture; adding an unmodified starch component to the cooked starch mixture; and adding a plurality of expandable microspheres to the cooked starch mixture; applying the adhesive composition to the first side of the substantially flat paper sheet to form a sheet with an applied adhesive composition; heating the sheet with an applied adhesive composition to a first temperature sufficient to expand the expandable microspheres; and heating the sheet with an applied adhesive composition to a second temperature sufficient to fully cure the adhesive composition.

DETAILED DESCRIPTION OF THE INVENTION

Typical adhesives for use in insulating paper products provide negligible, if any, insulating properties to the end product. These adhesive are generally useful only for adhering a liner (or liners) to the medium, allowing the air space between the tip of the flute and the liner to achieve the insulation. Further, since the adhesive composition only provides adhesion between the flute tip and the liner, there is very little space between the flute tip and the liner at the point of adhesion. The lack of space between these two elements at the point of adhesion provides very little, if any, added insulation. Since air is the primary means of insulation, the amplitude of the wave formation of the medium must be significant, which requires that the medium be made of a sheet of paper that is quite large. Further, to provide sufficient insulation, such typical products usually use thick layers of paper to form the liner(s), or alternatively use multiple layers of paper to form one liner. As a result, typical processing of such products is not only an expensive manufacturing process, but also results in a great deal of waste.

The present invention provides an adhesive composition that provides insulative properties to the product on which it is used. The adhesive compositions described herein may be useful in traditional corrugated paper board products having a medium and either one or two liners. Through the use of the inventive adhesive composition, a greater insulation space may be provided between the flute tip of the medium and the liner to which it is attached at the point of adhesion. In alternate embodiments, the inventive adhesive composition may be useful in forming a paper board insulation that avoids the need for a medium, instead relying upon the adhesive composition itself to provide the desired insulation. The adhesive composition described herein is substantially made from natural, biodegradable materials, and the products made with the inventive adhesive composition require less paper to form. The end result is a less expensive and more environmentally conscious product. The insulating products useful herein include paper products for consumer use, such as for hot drinking cups, hot food containers, and the like.

The present invention is based on the discovery that an adhesive composition for use in preparing insulating products may include a plurality of expandable microspheres therein. When these expandable microspheres are allowed to expand in an adhesive composition, they create a foam-like adhesive material, which provides added insulation to the product. For example, when the adhesive is applied between the liner and the tip of a flute of a medium, the expandable microspheres may be expanded, thereby providing an insulating space between the flute tip and the liner at the point of attachment. This insulated space adds to the insulative properties of the product formed, allowing for a medium having a smaller amplitude between waves to be used (i.e., requiring less air space), and yet still provide adequate insulation. The medium layer may have a flatter wave configuration, resulting in less paper used in the medium. In addition, the added insulation allows the product to use thinner paper and/or single-layered paper liners, resulting in less cost and less wasted materials.

In a first embodiment, the invention includes an adhesive for preparing an insulating board, such as corrugated or uncorrugated paper board. The paper board may be made from any type of paper material, including cellulosic paper materials traditionally used in insulating products. Desirably, the paper products used are recyclable materials.

The adhesive composition may be made from any number of materials. Desirably, the adhesive composition includes water, a starch component, a crosslinker component, an alkaline component, and a plurality of expandable microspheres. The adhesive composition may further include one or more humectants, preservatives, or fillers. Other materials that do not adversely affect the adhesive and insulating properties of the adhesive composition may be used as desired.

The adhesive composition may include any polar solvent, particularly water, in the formulation. In a desired embodiment, prior to setting (or gelatinizing) the composition, the adhesive composition includes the polar solvent in an amount of about 40% to about 75% by weight of the adhesive composition prior to setting of the composition, and most desirably from about 50% to about 70% by weight of the composition prior to setting of the composition.

The adhesive composition includes a starch component. The starch component may be present in the adhesive composition in any amount, and desirably is present in an amount of from about 20% to about 40% by weight of the adhesive composition prior to setting of the composition, and more desirably from about 25% to about 35% by weight of the adhesive composition prior to setting of the composition. The starch component may include any desired starch materials, particularly starch materials derived from natural sources, including, for example, corn. In some embodiments, the starch component may include starch having a highly branched composition. For example, the starch component may include unmodified starch or "pearl" starch. As used herein, the term "unmodified" starch refers to a starch composition having less than 25% amylose content. The unmodified starch may be used in any form, and is preferably used in powdered or granulated form having a diameter of about 20 microns. In other embodiments, the starch component may include a cooked starch, also referred to as a carrier starch. The cooked starch may have a higher viscosity than the unmodified starch.

In still other embodiments, the starch component may include a starch material having a composition with a higher concentration of straight chain materials. Such components may include a high amylose starch material, including that sold by Henkel Corporation under the trade name Optamyl®. As used herein, a starch having a high amylose content (referred to as "high amylose starch") includes at least 50% amylose content. In some embodiments, a high amylose starch may have between about 25% to about 50% amylose, and more desirably between about 35% and 50% amylose concentration. As will be explained below, in one embodiment, the use of a high amylose starch material in combination with an unmodified starch material may be beneficial to the expansion of microspheres in the adhesive composition. The combination of high amylose starch and unmodified starch results in a starch component that has a higher moisture content and a higher final setting (or curing) temperature.

In embodiments where the starch component includes a combination of materials, the starch component includes a mixture of unmodified starch and at least one of cooked starch or a high amylose starch. Desirably, the starch component includes a mixture of unmodified starch and high amylose starch. The unmodified starch component may be from about 60% to about 90% by weight of the starch component. In preferred embodiments, the unmodified starch component and the high amylose starch component are present in a ratio of from about 5:1 to about 3:1.

The adhesive composition may include one or more alkaline components. The alkaline component may be present in an amount of from about 0.5% to about 1.5% by weight of the adhesive composition prior to setting of the composition. The alkaline component may include any component having an alkaline nature. In particular embodiments, the alkaline component includes sodium hydroxide, however, any desired alkaline component may be used as desired.

The adhesive composition may include one or more crosslinking components. Crosslinkers useful in the present invention may include, for example, sodium tetraborate (also referred to as Borax). Crosslinkers may be present in the invention in an amount of from about 0.10% to about 0.20% by weight of the adhesive composition prior to setting of the composition.

The adhesive composition may include any optional components, including humectants, preservatives, or fillers. Humectants useful in the present invention aid in maintaining viscosity stability of the composition, and may include, for example, glycerol, glycerine, urea, propylene glycol, glyceryl triacetate, sugars and sugar polyols such as sorbitol, xylitol, and maltitol, polymeric polyols such as polydextrose, natural extracts such as *quillaia* or lactic acid, or any other desired composition having humectant properties. Humectants may be useful in the present invention in an amount of from about 0.1% to about 15% by weight of the adhesive composition prior to setting of the composition. Preservatives may be useful in the present invention, and include preservatives such as 1,2-benzisothiazolin-3-one. Preservatives may be used in the amount of from about 0.05% to about 0.20% by weight of the adhesive composition prior to setting of the composition. Any desirable fillers may be used as are known in the art.

The adhesive composition includes a plurality of expandable microspheres. The expandable microspheres useful in the present invention should be capable of expanding in size in the presence of heat and/or radiation energy (including, for example, microwave, infrared, radiofrequency, and/or ultrasonic energy). The microspheres useful in the present invention include, for example, heat expandable polymeric microspheres, including those having a hydrocarbon core and a polyacrylonitrile shell (such as those sold under the trade name DUALITE®) and other similar microspheres (such as those sold under the trade name EXPANCEL®).

The expandable microspheres may have any unexpanded size, including from about 12 microns to about 30 microns in diameter. In the presence of heat, the expandable microspheres of the present invention may be capable of increasing in diameter by about 3 times to about 10 times. That is, the diameter of the expandable microspheres may be expandable to about 300% of the starting diameter to about 1,000% of the starting material, and most desirably, the diameter of the expandable microspheres may be expandable from about 350% to about 600% of the starting diameter. Upon expansion of the microspheres in the adhesive composition, the adhesive composition becomes a foam-like material, which has improved insulation properties. It may be desired, as will be explained below, that the expansion of the microspheres takes place in a partially gelatinized adhesive composition.

The expandable microspheres have a particular temperature at which they begin to expand and a second temperature at which they have reached maximum expansion. Desirably, the temperature at which these microspheres begin to expand (Texp) is from about 180° F. to about 210° F., and more desirably from about 190° F. to about 208° F. The temperature at which the microspheres have reached maximum expansion (Tmax) is desirably from about 250° F. to about 285° F., and more desirably from about 257° F. to about 275° F. Of course, different grades of microspheres have different Texp and Tmax. For example, one particularly useful microsphere has a Texp of about 208° F. and a Tmax of about 275° F., while another useful microsphere has a Texp of about 190° F. and a Tmax of about 266° F. While any particular grade of microspheres may be used in the present invention, the process should be slightly modified to account for the Texp and Tmax of the microspheres.

Although the choice of the particular microspheres and their respective Texp and Tmax is not critical to the invention, the processing temperatures may be modified depending upon these temperatures. In most applications, it is desirable that the Tmax for the microspheres be a temperature that is equal to or lower than the full setting (or curing) temperature of the starch adhesive composition. As can be appreciated by those of skill in the art, the inventive adhesive composition includes a plurality of unexpanded microspheres in a fluid starch-based adhesive composition. Before the adhesive composition is fully set or cured, these microspheres are able to move within the composition and are able to expand. Once the adhesive composition is set, however, the microspheres are substantially locked in place, making expansion thereof difficult, if not impossible. For this reason, it is useful that the maximum expansion temperature of the microspheres (Tmax) be equal to or lower than the complete setting temperature of the adhesive composition.

Of course, it may be noted that the starch-based adhesive composition will begin to set, or gelatinize, at a lower temperature than the full cure temperature. In some embodiments, the initial setting temperature of the starch composition may be from about 138° F. to about 156° F. Although the starch adhesive will begin to gelatinize at this temperature, the adhesive composition may still have a high moisture content and will be substantially fluid. The temperature at which the starch adhesive composition fully sets is desirably equal to or higher than the Tmax of the expandable microspheres, however the temperature at which the starch adhesive composition fully sets may be between the Texp and Tmax of the microspheres.

It may be desired that the maximum expansion temperature of the microspheres (Tmax) and the final setting temperature of the adhesive composition differ by about 20° F.

to about 40° F., and more desirably about 30° F. This difference allows for the expandable microspheres to be expanded and for the adhesive to be properly set. Desirably, the temperature at which the adhesive begins to gelatinize may be about 20° F. to about 40° F. lower than the Texp of the microspheres, and more desirably about 30° F. lower than the Texp of the microspheres, and the temperature at which the adhesive is fully set may be about 20° F. to about 40° F. higher than the Tmax of the microspheres, and desirably about 30° F. higher than the Tmax of the microspheres.

In a particularly desirable embodiment of manufacturing products, the adhesive composition may be applied to the surface (or surfaces) of a product and subjected to heat sufficient to begin gelatinization of the adhesive. Beginning the gelatinization of the adhesive may aid in holding the adhesive and microspheres in place, but will allow the microspheres the freedom to expand. The heat may then be raised to a temperature sufficient to expand the microspheres. Finally, and the heat may be raised again to a temperature sufficient to fully set the adhesive composition. Heat may be applied by any desired method, including in an oven or through the use of heated rollers. It should be noted that the various stages (beginning gelatinization, expansion of the microspheres, and full setting of the adhesive) may be achieved by radiation energy, either as a replacement for or in addition to direct heat. That is, for example, the various steps may be achieved by use of microwave or radiofrequency radiation, for example. In addition, the process may include any combination of heat application and radiation application. For example, the beginning gelatinization of the adhesive composition may be achieved through direct heat, while the expansion of the microspheres may be achieved through application of radiation energy.

In some embodiments, the starch component of the adhesive composition includes a combination of unmodified starch and high amylose starch. This combination of starches results in a composition having a higher moisture content, and thus a higher final setting temperature. Although the beginning gelling temperature of the adhesive may remain about the same temperature, the final setting temperature may be higher than with unmodified starch alone. The present inventors have discovered that, by increasing the set temperature of the adhesive composition, a greater window of temperatures may be provided at which to expand the microspheres. Other additives may be included in the composition to increase the setting temperature of the adhesive as desired.

The adhesive composition includes a plurality of unexpended, expandable microspheres. Depending upon the particular expandable microspheres used in the composition, the desired amount of the microspheres in the composition may be modified. It has been discovered by the present inventors that if the adhesive composition includes too high a concentration of expandable microspheres, there will be insufficient adhesion upon expansion of the microspheres. However, if there is too low a concentration of expandable microspheres, there will be insufficient expansion of the resulting adhesive and thus insufficient insulation. Therefore, consideration of the loading level and the expansion ratio, as well as the expansion ratio and the temperature at the loading level, must be taken into account when determining the optimal concentration of expandable microspheres in the composition. If the expansion ratio of the microspheres is lower, there may be a higher concentration in the adhesive composition, and conversely, if the expansion ratio of the microspheres is higher, there may be a lower concentration in the adhesive composition.

Figure 1:
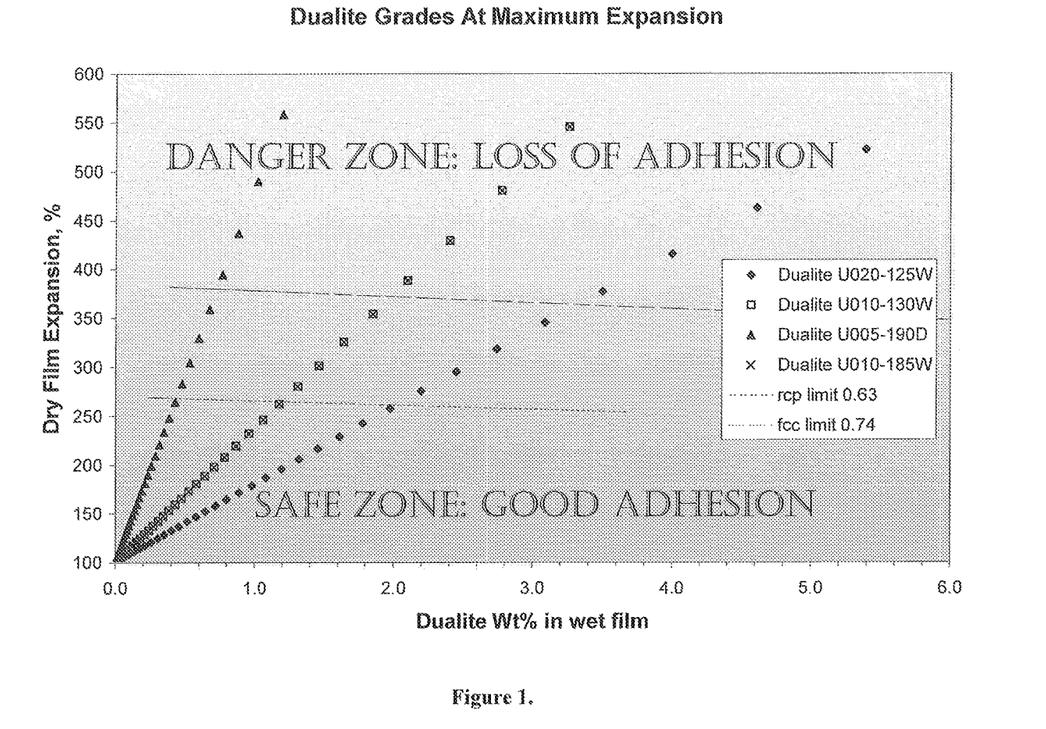
FIG. 1 depicts the results of testing conducted on various adhesives, showing the adhesion as compared to the expansion of the microspheres.

In preferred embodiments, it is desirable that the expandable microspheres be present in the adhesive composition in an amount of from about 0.5% to about 5.0% by weight of the adhesive composition prior to setting of the composition, and more desirably from about 1.0% to about 2.0% by weight of the adhesive composition prior to setting of the composition, and most desirably at about 1.2% by weight of the adhesive composition prior to setting of the composition. For an embodiment including expandable microspheres that have a diameter expansion ratio of about 370% at Tmax, the microspheres may be present in an amount of about 1.5% to about 2.0% by weight of the adhesive composition prior to setting of the composition. For an embodiment including expandable microspheres that have a diameter expansion ratio of about 470% at Tmax, the microspheres may be present in an amount of about 1.0% to about 1.5% by weight of the adhesive composition prior to setting of the composition. In systems where there are lower heating capabilities, it may be desirable to include a higher concentration of expandable microspheres, such as up to 4% by weight of the adhesive composition prior to setting of the composition. The expansion ratio of the expandable microspheres and the loading level of the microspheres will be related to each other. As set forth in FIG. 1, the Applicant has tested several different grades of expandable microspheres, demonstrating the concentration of the microspheres in various adhesive compositions that falls within the "danger zone" (loss of adhesion) and the "safe zone" (good adhesion). Desirably, the concentration of the microspheres in the adhesive composition should fall between these two zones. This balances expansion, and thus insulation, with adhesion of the resulting foam-like adhesive.

The present invention provides a method of preparing an adhesive composition having improved insulation properties. The method includes first combining a starch component, alkaline component, crosslinkers, polar solvent, and optional humectants, preservatives, or fillers to form a starch mixture. Once the starch mixture is formed, it may be partially gelatinized to form a gelatinized starch mixture, and then the plurality of expandable microspheres may be added to the gelatinized starch mixture. If desired, the plurality of expandable microspheres may be added to the starch mixture prior to beginning gelatinization. In some embodiments, the starch component may include a combination of unmodified starch and high amylose starch. In such embodiments, it may be preferable to combine the high amylose starch component, alkaline component, crosslinker, polar solvent, and optional humectants, preservatives and fillers, gelatinize this mixture, and then separately add the unmodified starch component. Once this mixture is achieved, the plurality of expandable microspheres may be added.

In other embodiments, the present invention provides a kit for providing an adhesive composition having improved insulation properties. In this embodiment, the kit includes two parts, a first part and a second part, which are desirably stored in separate containers. The first part includes a starch adhesive component, including the starch component, alkaline component, crosslinker, polar solvent, and optional humectants, preservatives, or fillers. The first part may be partially gelatinized if desired, providing increased viscosity to the first part. The second component includes the plurality of expandable microspheres. The second part may include the microspheres in any form, such as dry powder, slurry, or any desired form. The kit may further include a means for combining the two parts together to form the adhesive composition having improved insulation properties, such as a separate container into which each of the first and second parts may be fed. If desired, the kit may further include instructions for use in preparing the adhesive composition.

Figure 1A:
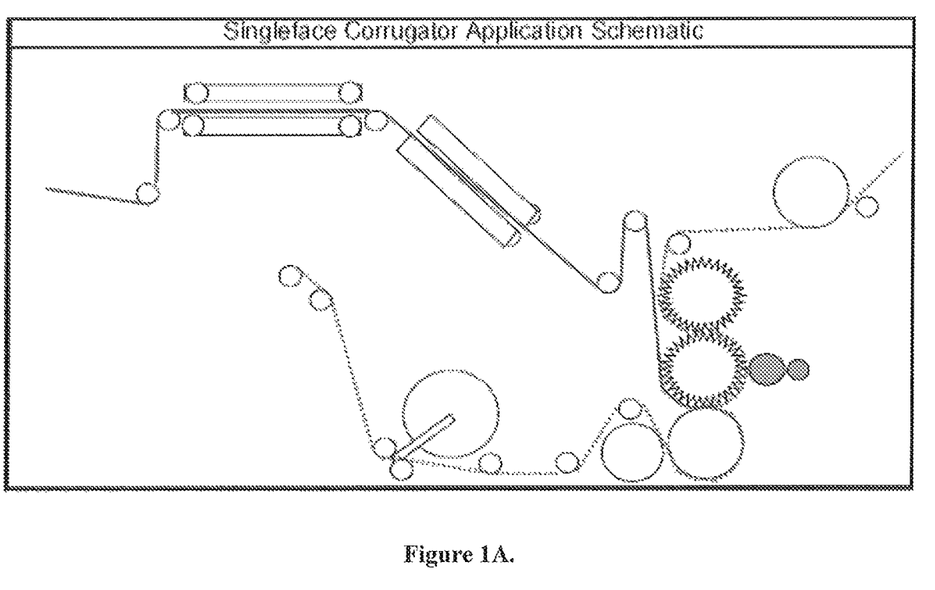
FIG. 1A is one embodiment of an apparatus for making corrugated board.

The present invention is further related to an insulated corrugated board. Any known process of forming corrugated board may be used, and FIG. 1A depicts one embodiment of an assembly useful in forming the corrugated board. Desirably, the board is made of paper that has a reduced thickness when compared to traditional insulating corrugated boards. Any type of paper may be used in the invention, for example, the paper may have a thickness of from about 0.0036 inches to about 0.0052 inches in thickness. In addition, it is desirable to use lower weight paper than that which is traditionally used in insulating products. Traditional insulating products generally use "33 #" paper for the various paper components. It is desirable to use paper that is of a lower weight than "23 #" paper, and more desirably it is desirable to use "18 #" paper for the various components of the corrugated board. That is, the various components (including liner(s) and medium) desirably include paper that is known as 18 #paper (0.0036 inches in thickness, density of about 67.72 g/m2).

The insulated corrugated board may be single faced or double faced. Single faced corrugated boards include a single paper liner, which is a substantially flat paper liner having a first side and a second side, and a medium, which is a paper liner having a first side and second side that has been formed into a sinusoidal wave configuration having a plurality of flutes on each side. In this embodiment, the first side of the paper liner is secured to the tips of the flutes on the first side of the medium. A double faced corrugated board further includes a second paper liner, which is a substantially flat paper liner having a first side and a second side, where the first side of the second paper liner is secured to the tips of the flutes on the second side of the medium. Although the below description of the board and the methods for making such boards are generally directed to single faced boards, it is to be understood that the invention further relates to double faced boards, which may be achieved by including a second liner either at the time of processing the first liner or after the first liner has been adhered.

The inventive corrugated board of the present invention includes the inventive adhesive described above. The inventive adhesive, including the starch component, alkaline component, crosslinker, polar solvent, plurality of expandable microspheres, and optional humectants, preservatives, or fillers is applied to the tips of the flutes of the medium. In one embodiment of the invention including a high amylose starch component and unmodified starch component, the high amylose starch component, an alkaline component, a crosslinker, and water are combined to form a starch mixture, and then the high amylose starch mixture is cooked to form a cooked starch mixture. Next, an unmodified starch component may be added to the cooked starch mixture, and a plurality of expandable microspheres are added to the cooked starch mixture. Alternatively, the adhesive components may be simply added together.

If a single faced corrugated board is desired, the adhesive composition is applied to the tips of the flutes of only one side of the medium, and the first side of one paper liner is applied thereon. If desired, the adhesive composition is partially gelatinized. The expandable microspheres are allowed to expand and then the adhesive composition is set in place. The resulting corrugated board thus has an insulating space between the surface of the paper liner and the tips of the flutes of the medium at the point of adhesion. The corrugated board desirably has an insulating space between the paper liner and the tips of the flutes at the point of adhesion in the amount of about 0.01 inches. It should be understood, of course, that the particular increase in distance between the flute tips and the liner is not critical, and that a small increase in distance may generate a significant amount of added insulation. In desired embodiments, the space between the flute tip and the release liner in the present invention may be greater than the distance between flute tip and liner without expanded materials. At the same time, the desired increased distance between the flute tip and the liner should not be so great as to be detrimental to the bond strength between the two.

If a double faced corrugated board is desired, the adhesive composition is applied to the tips of the flutes of the second side of the medium, and a second paper liner is applied thereon. Similarly, the adhesive is partially gelatinized, the expandable microspheres are allowed to expand and then the adhesive composition is set in place. The resulting corrugated board thus has an insulating space between the surface of the paper liner and the tips of the flutes of the medium. The corrugated board desirably has an insulating space between the paper liner and the tips of the flutes at the point of adhesion in an amount that is greater than the space traditionally seen with conventional adhesives. In one embodiment, the increase in space between the two generated by the expanded microspheres is about 0.001 inches.

The present invention is not limited to single or double faced corrugated board, and may be used in a number of applications. Other applications in which the invention is useful include doubleback corrugator formulations with higher viscosity, coater applications with lower viscosity, and the like.

It is particularly preferred that the medium layer have a reduced amplitude as compared to traditional corrugated boards. Through the use of the present invention, there is an insulating space between the tip of the flute and the surface of the liner at the point of contact, which provides added insulation. This added insulation reduces the need for as much air space between the flutes on the second side of the medium and the paper liner. In a preferred embodiment, the amplitude of the medium is about 0.04 inches as measured from the tip of adjacent flutes, while traditional mediums have a flute wavelength of from 0.063 to about 0.134. Thus, in one embodiment, the invention provides a corrugated board that has a medium having a reduced wavelength, where the reduced wavelength is about 0.02 to about 0.09 inches less than traditional corrugated boards.

It has been discovered that through the use of the present adhesive composition, and reducing the amplitude of the medium reduces the overall amount of paper used in the corrugated board by about 20% as compared to traditional corrugated boards. In addition, the added insulation allows for insulating products to be formed with thinner paper liners and mediums, again resulting in reduced cost and also reduced waste.

The present invention further provides a method of forming a corrugated board having improved insulative properties. As explained above, the present inventors have discovered that the adhesive composition must balance the setting temperature of the starch-based adhesive with the expansion temperature of the expandable microspheres used therein. In the inventive method, a first substantially flat paper liner having a first and second side is provided. The first paper liner has a thickness of from about the paper may have a thickness of about 0.0036 inches to about 0.0052 inches in thickness, which is thinner than traditional paper liners used in corrugated boards, which traditionally have a thickness of about 0.0062 inches. A second paper liner having a first and second side is provided, which is formed into a medium having a sinusoidal wave including a series of flutes on each of the first and second sides. The medium desirably has an amplitude of about 0.04 inches as measured from the tip of adjacent flutes, and a wavelength of about 0.13 inches.

An adhesive composition is prepared. The adhesive composition may be prepared immediately prior to forming the corrugated board or it may be prepared in advance and stored until needed. The adhesive composition is prepared by combining a starch component, alkaline component, crosslinker, polar solvent, and optional humectants, preservatives, or fillers to form a starch mixture, and partially gelatinizing the starch mixture to form a gelatinized mixture. A plurality of expandable microspheres is added to the gelatinized mixture, forming the adhesive composition. If desired, the expandable microspheres may be added to the starch mixture prior to partially gelatinizing the mixture.

As explained above, the starch component of the adhesive composition may include an unmodified starch, cooked starch, high amylose starch, and combinations thereof. The various components of the adhesive composition may be present in the adhesive composition in the amounts described above. In preferred embodiments, the starch component includes a mixture of unmodified starch and high amylose starch. It is particularly preferred that the temperature of maximum expansion of the microspheres be a temperature that is lower than the final setting temperature of the adhesive composition, for the reasons set forth above. However, the temperature at which the adhesive composition begins to gel or set may be lower than the expansion temperature of the expandable microspheres. If desired, additives or other components may be added to the adhesive composition to raise the setting temperature thereof. It is desirable that the full setting temperature of the adhesive be at least as high as the Tmax of the expandable microspheres, and particularly desirable that the full setting temperature of the adhesive be at least 30° F. higher than the Tmax of the expandable microspheres.

In the method of forming the corrugated board, a predetermined amount of the adhesive composition is applied to the tips of the flutes of the first side of the medium. Desirably, the adhesive composition is applied in a relatively thin layer, the layer having a thickness of from about 0.05 to about 0.07 inches. The adhesive composition may be applied in the presence of heat and/or pressure. In one embodiment, the adhesive composition may be applied under a pressure of about 30 bar and as the medium is heated at a temperature of about 300° F.

After the adhesive composition has been applied to the tips of the flutes of the first side of the medium, the tips of the flutes are contacted with the first side of the first paper liner. It is desirable that the contacting be performed under a slight pressure, so as to effectively join the medium and the paper liner, but excessive pressure is to be avoided (to avoid squeezing out the adhesive from the point of contact). At this point, an uncured corrugated product is formed, where the paper liner and the medium are secured to each other via the adhesive, but the adhesive has not been set. If desired, the uncured corrugated product may be exposed to heat and/or radiation energy sufficient to begin gelatinization of the adhesive, but insufficient to expand the plurality of expandable microspheres. Gelatinization of the adhesive may be useful in holding the various components of the product in place until final curing is established.

The uncured corrugated product is then exposed to heat (including in an oven or via contact with heated rollers) and/or radiation energy (including, for example, microwave, infrared, radiofrequency, or ultrasonic energy) to expand the plurality of microspheres. In one embodiment, the uncured corrugated product is exposed to heat at a temperature sufficient to expand at least a majority of the microspheres on the tip of one flute, but the temperature is insufficient to fully set the adhesive composition. In another embodiment, the uncured corrugated product is exposed to microwave or infrared energy sufficient to expand at least a majority of the expandable microspheres, but at an energy level that will not fully set the adhesive composition. The resulting product is an uncured corrugated product having expanded microspheres.

As can be understood, at this point in the process, the microspheres at any given flute tip have expanded to form a foam-like adhesive composition, generating an increased space between the flute tip and the paper liner. Thus, during the manufacturing process, it is important that the adhesive composition be permitted to expand and separate the first paper liner and the medium. That is, any pressure holding the first paper liner and the medium must not be so great to prohibit expansion of the adhesive and thus separation of the paper liner and the medium. If the pressure is so great, the adhesive may expand to the side, i.e., into the air space between the medium and the paper liner. In addition, any heat and/or radiation energy applied to the product should not be so great as to fully set the adhesive composition, allowing the microspheres to expand. It is desirable that the expanded adhesive composition be located at each of the flute tips at the point of contact with the liner, thus providing insulation space between the first paper liner and the medium at the site of contact.

After expansion of the microspheres, the uncured corrugated product having expanded microspheres may then be exposed to heat and/or radiation energy (including microwave or infrared energy) sufficient to fully set or cure the adhesive composition. The result is a corrugated paper having improved insulative properties.

The method described above provides a single-faced corrugated board. However, the above method may further be used to provide a double-faced corrugated board. In addition to the above steps, a second substantially flat paper liner may be provided. The second liner may be applied to the second side of the medium at the same time as the first liner is applied to the first side of the medium, or the second liner may be applied to the second side of the medium after the first liner is adhered to the medium. It may be desirable that the second liner be applied to the second side of the medium after the first liner has been fully adhered to the medium. The processing and setting steps as described above may be repeated with the second liner to provide a double-faced corrugated board.

Figure 2:
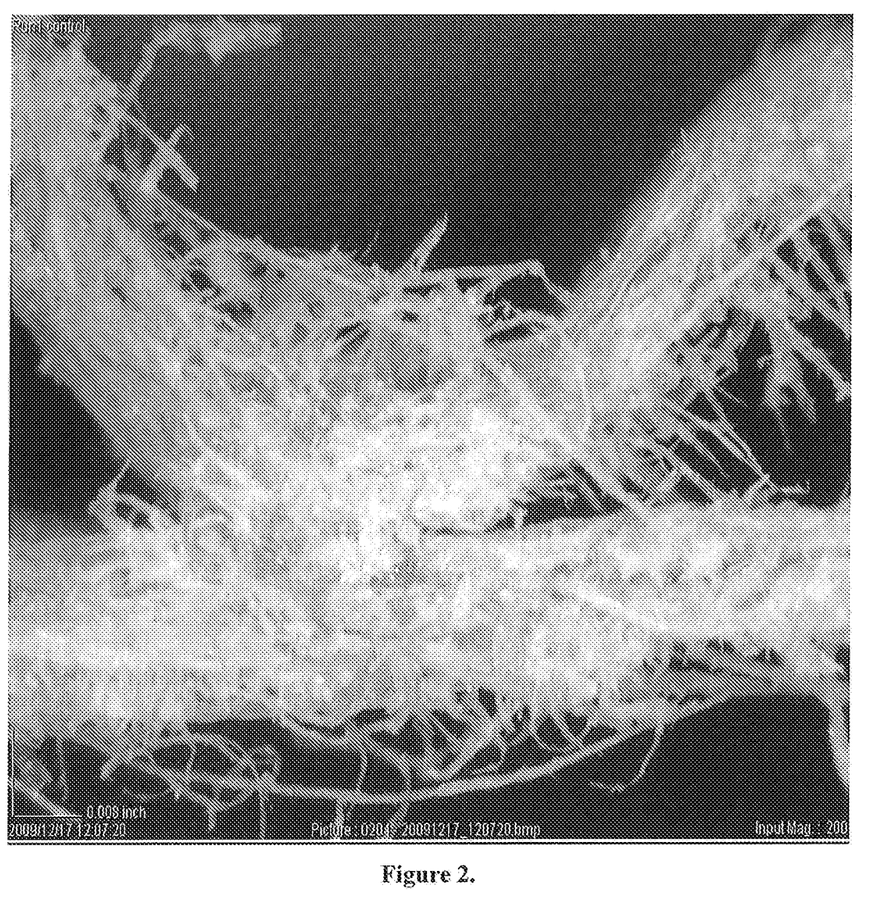
FIG. 2 is a close up cross sectional view of a corrugated board that does not include expandable microspheres.
Figure 3:
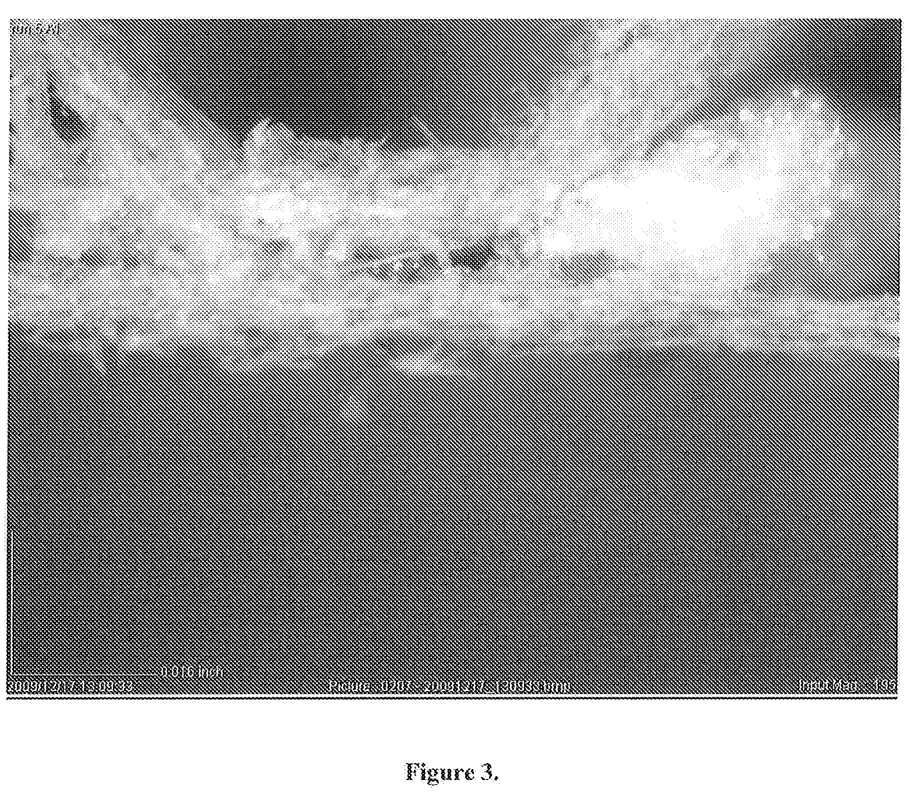
FIG. 3 is a close up cross sectional view of a corrugated board that includes expandable microspheres.
Figure 4:
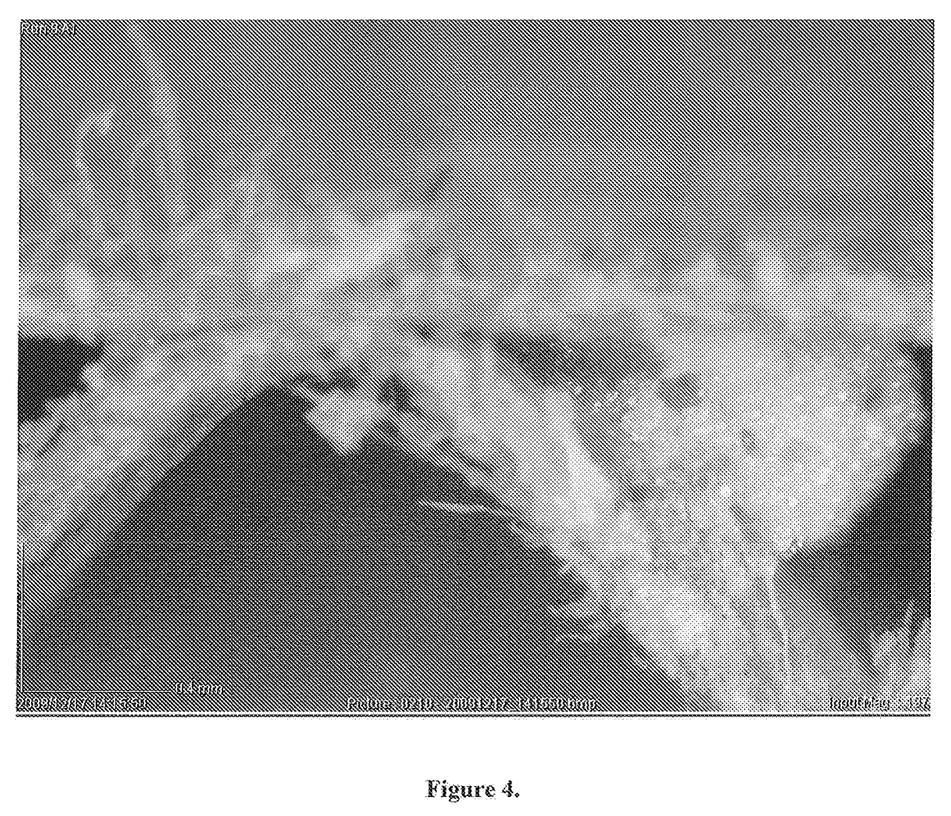
FIG. 4 is a close up cross sectional view of a corrugated board that includes expandable microspheres.

In some embodiments, it may be desirable to form shoulders of expanded adhesive material (also referred to as "fillets") along the sides of the flute tips, between the flute and the liner. For example, as can be seen in FIG. 2, which is a close up cross-sectional view of an adhered corrugated board without expandable microspheres, there is little material at the sides of the flute tip. FIGS. 3-4, however, are close up cross-sectional views of an adhered corrugated board with expandable microspheres, which depict the presence of expanded adhesive composition at the sides of the flute. These shoulders may aid in strength of the bond between the medium and liner, and may therefore may be desirably generated. However, it is of course understood that formation of shoulders along side the flutes is not required and may not, in some embodiments, be desired.

In an alternate embodiment, there is provided an insulating paper product that has no medium, and a method for forming an insulating paper product that has no medium. As may be appreciated by those of skill in the art, conventional corrugated insulating boards require the presence of the medium, which has a sinusoidal wave configuration to provide an air space between the medium and the paper liner(s). The air pockets provide the necessary insulation. Since the medium layer constitutes more than half of the paper of the corrugated product in a single-faced design, it would be particularly desirable that the medium layer be omitted. Removing the medium would result in a product that uses less than half of the paper traditionally required, which would significantly reduce the cost associated with the product and also reduces the waste generated by more than half. However, heretofore, it has been difficult to achieve a product that has the necessary insulation without including the medium layer.

The present invention provides an insulative product that does not include a medium layer. It has been discovered that the adhesive composition of the present invention is capable of providing the necessary insulation required in insulating products. In this embodiment, there is provided an insulating sheet including a substantially flat paper liner having a first side and a second side. The first side of the paper liner includes a plurality of expandable microspheres secured thereto in an adhesive composition, where the plurality of expandable microspheres has been expanded and the adhesive composition has been set or cured. Thus, the product includes a paper liner having an adhered, foam-like composition on the first side thereof. The expandable microspheres include those described above, and the adhesive composition includes the components described above, including the starch component, alkaline component, crosslinker, polar solvent, and optional humectants, preservatives, or fillers. As explained above, the starch component of the adhesive composition may include an unmodified starch, cooked starch, high amylose starch, and combinations thereof.

The adhesive composition of the insulative product may be applied to the first surface of the paper liner in any configuration desired, including in a series of dots, stripes, waves, checkerboard patterns, any general polyhedron shapes that have substantially flat bases, and combinations thereof. Further, the adhesive composition may be applied to the first surface in a series of cylinders. In addition, if desired, the adhesive composition may be applied to the first surface as a substantially flat sheet of adhesive covering the entire first surface or covering a portion of the first surface. Optionally, a second paper liner may be applied to the top surface of the adhesive composition, forming a sandwiched configuration of: first paper liner—adhesive with expanded microspheres—second paper liner.

A method of forming an insulative sheet is also provided. In this method, there is first provided a substantially flat paper liner having a first surface and a second surface. An adhesive composition is prepared. The adhesive composition may be prepared immediately prior to forming the insulative sheet, or it may be prepared in advance and stored until needed. The adhesive composition is prepared by combining the materials described above, including a starch component, alkaline component, crosslinker, polar solvent, and optional humectants, preservatives, or fillers to form a starch mixture, and gelatinizing the starch mixture to form a gelatinized mixture. In embodiments where the starch component includes a combination of unmodified starch and a high amylose starch component, it may be desirable to partially gelatinize the high amylose starch component, alkaline component, crosslinkers, polar solvent, and optional humectants, preservatives and fillers prior to adding the unmodified starch component. A plurality of expandable microspheres is added to the partially gelatinized mixture, forming the adhesive composition. If desired, the expandable microspheres may be added to the starch mixture prior to partially gelatinizing the mixture.

As explained above, the starch component of the adhesive composition may include an unmodified starch, cooked starch, high amylose starch, and combinations thereof. The starch component desirably includes the mixture of unmodified starch and high amylose starch, as explained above. The various components of the adhesive composition may be present in the adhesive composition in the amounts described above. It is particularly preferred that the temperature of maximum expansion of the microspheres (Tmax) be a temperature equal to or lower than the full setting temperature of the adhesive composition. If desired, additives or other components may be added to the adhesive composition to raise the setting temperature thereof. It is desirable that the full setting temperature of the adhesive be at least as high as the Tmax of the expandable microspheres, and particularly desirable that the full setting temperature of the adhesive be at least 30° F. higher than the Tmax of the expandable microspheres.

In the method of forming the insulative sheet, a predetermined amount of the adhesive composition is applied to the first surface of the paper liner. The adhesive composition may be applied in any configuration desired, including, for example, in a series of dots, stripes, waves, checkerboard pattern, a series of polyhedrons, and combinations thereof. Further, the adhesive composition may be applied to the first surface in a series of cylinders. In addition, if desired, the adhesive composition may be applied to the first side as a substantially flat sheet of adhesive, covering all or part of the first side of the paper liner. The adhesive composition may be applied in any desired thickness, and desirably is applied in a thickness of about 0.04 inches. In embodiments where the composition is applied in the form of a cylinder, it may be desirable that the height of each cylinder is approximately the same as the diameter of each cylinder. The cylinders may be applied to the first surface in any configuration, desirably each cylinder is spaced a substantially equal distance from each other cylinder. It is particularly desirable that the separation between adjacent cylinders is about two times the height of the cylinders. The adhesive composition may be applied in the presence of heat if desired; however, it is important that the heat at application not be so high as to fully set the adhesive composition.

After the adhesive composition has been applied to the first side of the paper liner, the paper liner with wet adhesive thereon may be exposed to heat and/or radiation energy to begin to set the adhesive composition. The adhesive composition therefore locks in the components, including the plurality of microspheres, in place and adheres them to the surface of the paper liner. It may be desired to only partially set the adhesive composition, thereby providing a composition that locks in the components and maintains them sticking to the surface of the paper liner, but is not completely set. As explained above, only partially setting the adhesive composition (i.e., leaving a higher amount of moisture in the adhesive, such as at least 10% moisture content) allows the expandable microspheres to expand.

After setting of the adhesive, the paper liner is then exposed to heat and/or radiation energy sufficient to expand the plurality of microspheres. In one embodiment, the paper liner with wet adhesive thereon is exposed to heat at a temperature sufficient to expand at least a majority of the microspheres. In another embodiment, the paper liner with wet adhesive thereon is exposed to microwave or infrared energy sufficient to expand at least a majority of the expandable microspheres. The resulting product is a paper liner having an adhesive having expanded microspheres therein. The adhesive composition may then be exposed to heat and/or radiation energy sufficient to fully set the adhesive composition.

If desired, after application of the adhesive composition to the first side of the paper liner, a second paper liner having a first side and second side may be provided and the first side of the second paper liner applied to the surface of the applied adhesive composition, forming a sandwich configuration. Thereafter, expansion of the microspheres and setting of the adhesive may take place as explained above.

The present invention may be better understood through analysis of the following examples, which are non-limiting and are intended only to help explain the invention.

Examples

Example 1—Formation of an Adhesive with Improved Insulating Properties

An adhesive composition was prepared having the following composition:

| Component | Wt. % |
|---|---|
| Water (1) | 17.20 |
| Crosslinker[1] | 0.14 |
| Cooked starch | 1.09 |
| Alkaline agent[2] | 0.97 |
| Water (2) | 9.73 |
| Water (3) | 24.16 |
| Humectant[3] | 10.63 |
| Unmodified starch | 34.78 |
| Preservative[4] | 0.10 |
| Expandable microspheres[5] | 1.20 |

[1]sodium tetraborate
[2]sodium hydroxide, 50% FCC, Rayon
[3]glycerol, glycerine, USP 99.7%
[4]Proxel GXL; 1,2-benzoisothiazolin-3-one
[5]Expancel ® microspheres Water (1) was mixed with the crosslinker, and cooked starch was added. The mixture was heated in a bath at 140° F. The alkaline agent was added to the mixture, and mixed for two minutes to form a gel. The mixture was then removed from the bath, and water (2) was added. The mixture was mixed at high speed for 5-10 minutes. During this mixing process, a separate mixture of water (3), humectant and unmodified starch were mixed until smooth. The two mixtures were combined and mixed until smooth. Preservatives were then added and the resulting mixture mixed for 10 minutes. The expandable microspheres were then added and the mixture mixed for 10 minutes.

Example 2—Formation of an Adhesive with Improved Insulating Properties

An adhesive composition was prepared having the following composition:

| Component | Wt. (lbs) |
|---|---|
| Water (1) | 710 |
| High amylose starch | 150 |
| Caustic soda beads | 15 |
| Primary Crosslinker[1] | 5.5 |
| Water (2) | 1378 |
| Secondary Crosslinker A[1] | 4 |
| Unmodified starch | 750 |
| Secondary Crosslinker B[1] | 4 |
| Humectants[2] | 15 |
| Expandable microspheres | 36 |

[1]sodium tetraborate
[2]glycerine or urea

Water (1) is introduced into a first mixer and heated to 110° F. To this heated water is added the high amylose starch, caustic soda beads and primary crosslinker. In a second mixer, water (2) is introduced and heated to 98° F. Secondary crosslinker A, unmodified starch, secondary crosslinker B and humectants are added and mixed. The two mixers are combined and mixed. The expandable microspheres are added to the resulting mixture.

Example 3—Comparison of Various Adhesives

Four adhesive compositions were prepared (C1, C2, C3, and I), which are as follows: Composition C1 included an unmodified corn starch based adhesive composition (Stein-Hall adhesive) without expandable microspheres; Composition C2 included an unmodified corn starch based adhesive composition (Stein-Hall adhesive) with Dualite 130W microspheres; Composition C3 included a starch based adhesive composition made from a blend of unmodified corn starch and high amylose corn starch; and Composition I included a starch based adhesive composition made from a blend of unmodified corn starch and high amylose corn starch with Dualite 130W microspheres. The adhesives were used in the formation of corrugated rolls having different combinations of 18 #, 23 #, and 33 #paper for the liner and for the medium, and were evaluated after drying. The results are summarized below.

| Trial | Speed (fpm) | Paper Combo Liner-Medium Adhesive | Add-on (dry-lb/msf) | SFC Thickness (in) | Peel strength (g/in) | Observations |
|---|---|---|---|---|---|---|
| 1 | 338 | 18#-18# C1* | 2.2 | 0.055 | 141 | control, standard run |
| 2 | 62 | 18#-18# C2-A** | 4.1 | 0.060 | 22 | no impression lines on back |
| 3 | 295 | 18#-18# C2-B*** | 5.3 | 0.057 | 120 | impression lines on back |
| 4 | 360 | 33#-33# C3-A | 0.81 | 0.062 | FT | |
| 5 | 360 | 18#-18# C3-B | 0.82 | 0.054 | FT | edge CD warp |
| 7 | 344 | 23#-18# C3-C | 1.35 | 0.053 | FT | |

-continued

| Trial | Speed (fpm) | Paper Combo Liner-Medium Adhesive | Add-on (dry-lb/msf) | SFC Thickness (in) | Peel strength (g/in) | Observations |
|---|---|---|---|---|---|---|
| 6 | 344 | 23#-18# I1 | 4.78 | 0.053 | FT | some expansion |
| 8 | 321 | 23#-18# I2 | 3.83 | 0.055 | FT | fillet visible |
| 9 | 331 | 23#-18# I3 | 4.16 | 0.058 | FT | fillet visible |
| 10 | 321 | 23#-18# I4 | 4.27 | 0.057 | FT | visible expansion |
| 11 | 311 | 18#-23# I5 | 5.92 | 0.056 | FT | fillet visible |
| 12 | 300 | 18#-18# I6 | 4.92 | 0.055 | FT | ran very well in splice, flat sheets |

*Cross-section of paper seen in FIG. 2
**Cross-section of paper seen in FIG. 3
***Cross-section of paper seen in FIG. 4

Full Tear (FT) indicates that the peel strength of adhesive had sufficient strength, and as such the peel strength could not be measured. Looking at the data generated, several observations were made. First, the inventive adhesive composition was found to have better peel strength than the control adhesive and the control adhesive with microspheres. In addition, each of the tests using composition I (inventive) were found to have a visible fillet and/or visible expansion, and thus it can be concluded that the inventive composition forms better fillets (shoulders) than without microspheres. As can be seen with control composition C3, for example, the use of a composition using a high amylose adhesive without microspheres may lead to undesirable edge cross direction warpage, especially for low weight paper. Additionally, it was found that the inventive adhesive composition may be useful on thinner liner-medium without any warpage, and a high corrugating speed can be used. Due to the expansion of the microspheres in between the medium and liner and also in the fillets shoulders, heat resistance of the article may be increased due to the rigidity and strength of the article, which maintains the medium-liner configuration.

As can be seen, Composition I was very successful when used on each grade of paper, and particularly successful when used on the lowest grade of paper liner and medium (Trial 12). This trial was found to run very well in splice, and gave flat sheets.

What is claimed is:

1. A method of making a paper insulative sheet, comprising the steps of:
  a. providing a substantially planar paper sheet having a first side and a second side, said first side having any type of surface to accommodate an insulating component;
  b. preparing an adhesive composition by combining a high amylose starch component that has an amylose content greater than 50%, an unmodified starch component, an alkaline component, sodium tetraborate, water, and about 0.5 to about 4 wet basis weight percent of a plurality of expandable microspheres to form a starch mixture; wherein the expandable microspheres has (i) a $T_{exp}$, the temperature at which the expandable microspheres begin to expand and (ii) a $T_{max}$, the temperature at which the expandable microspheres have reached maximum expansion;
  c. applying said adhesive composition to said surface of said first side of said substantially planar paper sheet to form a sheet with an applied adhesive composition;
  d. applying a second substantially planar paper sheet having a first side and a second side, said first side having any type of surface to accommodate the insulating component, to an exposed surface of the applied adhesive composition to form the paper insulative sheet;
  e. exposing the paper insulative sheet to a radiation energy sufficient to expand the expandable microspheres while leaving at least 10% moisture content in the applied adhesive composition; and
  f. exposing the paper insulative sheet to an additional radiation energy to fully set the applied adhesive composition.

2. The method of making the paper insulative sheet of claim 1, wherein the radiation energy sufficient to expand the expandable microspheres is infrared energy.

3. The method of making the paper insulative sheet of claim 1, wherein the radiation energy sufficient to expand the expandable microspheres expands at least a majority of the expandable microspheres in the applied adhesive composition.

* * * * *